United States Patent
Haverinen et al.

(10) Patent No.: US 7,197,456 B2
(45) Date of Patent: Mar. 27, 2007

(54) ON-LINE PARAMETRIC HISTOGRAM NORMALIZATION FOR NOISE ROBUST SPEECH RECOGNITION

(75) Inventors: Hemmo Haverinen, Tampere (FI); Imre Kiss, Tampere (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 10/136,039

(22) Filed: Apr. 30, 2002

(65) Prior Publication Data
US 2003/0204398 A1  Oct. 30, 2003

(51) Int. Cl.
G10L 15/00 (2006.01)
G10L 15/20 (2006.01)
G10L 21/00 (2006.01)
G10L 21/02 (2006.01)

(52) U.S. Cl. .................. 704/233; 704/226; 704/227; 704/234

(58) Field of Classification Search ............ 704/233, 704/250, 205, 247, 234, 224, 226, 237, 206, 704/227
See application file for complete search history.

(56) References Cited

U.S. PATENT DOCUMENTS

| | | | |
|---|---|---|---|
| 5,148,489 A * | 9/1992 | Erell et al. .................. 704/226 |
| 5,323,337 A | 6/1994 | Wilson et al. .............. 364/574 |
| 5,337,251 A | 8/1994 | Pastor ........................ 364/484 |
| 6,038,528 A | 3/2000 | Mammone et al. ......... 704/203 |
| 6,173,258 B1 | 1/2001 | Menendez-Pidal et al. . 704/233 |
| 6,275,795 B1 | 8/2001 | Tzirkel-Hancock ......... 704/214 |
| 6,289,309 B1 | 9/2001 | deVries ...................... 704/233 |
| 6,691,090 B1 * | 2/2004 | Laurila et al. .............. 704/250 |
| 6,721,698 B1 * | 4/2004 | Hariharan et al. .......... 704/203 |
| 2002/0049593 A1 | 4/2002 | Shao .......................... 704/251 |
| 2003/0004720 A1 | 1/2003 | Garudadri et al. ......... 704/247 |
| 2003/0115054 A1* | 6/2003 | Iso-Sipila ................... 704/233 |

OTHER PUBLICATIONS

ETSI ES 201 108 V1.1.2 (Apr. 2000); Speech Processing, Transmission and Quality aspects (STQ); Distributed speech recognition; Front-end feature extraction algorithm; Compression algorithms.
"Histogram Based Normalization in the Acoustic Feature Space"; Molau et al.; ASRU 2001 Workshop on Automatic Speech Recognition and Understanding, 2001.
"Quantile Based Histogram Equalization for Noise Robust Speech Recognition"; Hilger et al.; Eurospeech 2001, pp. 1135-1138.
IEEE 0-7803-7343-X/02; Molau et al.; "Histogram Based Normalization in the Acoustic Feature Space"; pp. 21-24; 2002.

* cited by examiner

*Primary Examiner*—Richemond Dorvil
*Assistant Examiner*—Thomas E. Shortledge
(74) *Attorney, Agent, or Firm*—Ware, Fressola, Van Der Sluys & Adolphson LLP

(57) ABSTRACT

A method for improving noise robustness in speech recognition, wherein a front-end is used for extracting speech feature from an input speech and for providing a plurality of scaled spectral coefficients. The histogram of the scaled spectral coefficients is normalized to the histogram of a training set using Gaussian approximations. The normalized spectral coefficients are then converted into a set of cepstrum coefficients by a decorrelation module and further subjected to ceptral domain feature-vector normalization.

32 Claims, 8 Drawing Sheets

ON-LINE PARAMETRIC HISTOGRAM NORMALIZATION FOR NOISE ROBUST SPEECH RECOGNITION

FIELD OF THE INVENTION

The present invention relates generally to the field of speech processing and, more particularly, to noise robust speech recognition.

BACKGROUND OF THE INVENTION

Speech recognition technology allows a user of a communications network to access a computer or a hand-held electronic device without using a keyboard to type in words, for example. In particular, a spoken language system provides user-computer interaction, which enables natural conversations between people and machine.

A speech recognition system is roughly divided into a feature extractor (front-end) and a recognizer (back-end). The front-end algorithm converts the input speech waveform signal into feature parameters, which provide a compact representation of the input speech, while retaining the information essential for speech recognition. The back-end algorithm performs the actual recognition task, taking the feature parameters as input and performing a template-matching operation to compare the features with reference templates of the possible words, or other units of speech, to be recognized.

Typically, in a speech recognition system, the front-end is used to convey feature parameters, instead of the encoded speech waveform, to a speech recognition back-end. In particular, when speech recognition processing is carried out in a Distributed Speech Recognition (DSR) system, feature parameters require less bandwidth for radio transmission than the encoded speech waveform and, therefore, can be sent to an automatic speech recognition (ASR) server using a data channel. This eliminates the need for a high bit-rate speech channel. In embedded systems like mobile terminals, the front-end provides the speech features to the back-end in a form that is better suited for recognition than the original sampled speech.

The European Telecommunications Standard Institute (ETSI) has established the standard for DSR signal processing. In ETSI ES 201 108 V1.1.2, a standard algorithm for front-end feature extraction and their transmission is published. The standard algorithm calculates feature vectors with fourteen components for each 10 ms frame of speech. In particular, this ETSI publication covers the algorithm for front-end feature extraction to create Mel-Frequency Cepstral Coefficients (MFCC). While the standard algorithm, as disclosed in the ETSI publication, is designed for wireless transmission, the basic methodology is applicable to a speech recognition system embedded in a hand-held electronic device, for example. Cepstrum is a term for the Discrete Cosine Transform of the logarithm of the power spectrum of a signal, and mel-frequency warping is a process of non-linearly modifying the scale of the Fourier transform representation of the spectrum. From the mel-frequency warped Fourier transform representation of the log-magnitude spectrum, a set of cepstral coefficients or parameters are calculated to represent the speech signals. The extracted cepstral coefficients or parameters are known as feature vectors. They are conveyed to the back-end recognizer to perform the actual probability estimation and classification in order to recognize the spoken words. Because different speakers have different voices, talking speeds, accents and other factors that can affect a speech recognition system, it is important to have good quality feature vectors to ensure a good performance in speech recognition. Furthermore, environmental noises and distortion can also deteriorate the quality of feature vectors and influence the performance of the speech recognition system.

Currently, the performance of a speech recognition system is improved by training the acoustic models with relatively noise-free speech data to maximize the performance in clean speech conditions. FIG. 1 shows a standard MFCC front-end. As shown, the input speech is transformed by spectral conversion (FFT) into a set of spectral coefficients. The spectral coefficients are scaled by a Mel-scaling module. Typically, the front-end produces a feature vector (frame) in every 10 ms. After Mel-scaling, the speech signal is represented as an N (N=22) dimensional vector where each component corresponds to the spectral energy of that frequency band. After the Mel-scaling, a non-linear transform (Logarithm) is applied to the Mel-vector components. Discrete Cosine Transform (DCT) is then used to de-correlate the signal. A differentiator is used to obtain the information between consecutive frames by taking the first and second derivatives of the vector. Finally, cepstral domain feature vector normalization is applied to reduce the mismatch between training and testing conditions.

When this type of speech recognition system is used in a high-noise environment, such as in a car, the background noise may cause a mismatch between the acoustic models and the speech data. Currently, histogram normalization techniques are used to reduce the mismatch. In a histogram of spectral coefficients, the abscissa corresponds to the spectral values, and the ordinate values correspond to the likelihood of the corresponding spectral value. In a noisy environment, such as in a fast-moving car, the feature vectors may be changed due to noise and become different from those obtained in a quiet environment. Consequently, the shape and position of the histogram of the testing spectral signals are significantly different from those of the training spectral signals. In a front-end, as shown in FIG. 1, the changes in the features are compensated for in the cepstral domain by feature vector normalization. This method, known as cepstral domain feature vector normalization, is an effective method in improving noise robustness. However, it has its disadvantages. When DCT is applied on the distorted (noisy) spectral signals, the distortion spreads over all cepstral parameters. Even if the environmental noise is localized in a certain frequency band, the noise will affect all of the cepstral coefficients after the DCT process. Thus, even if cepstral domain feature vector normalization effectively removes the mismatch between different environments, the normalized signal will always have the residues of noise in all of the cepstral coefficients.

Mammone et al. (U.S. Pat. No. 6,038,528) discloses a speech processing method, wherein cepstral parameter normalization is based on affine transformation of the ceptral coefficients. This method is concerned with the coefficients after cepstral transformation and, therefore, is also susceptible to the spreading of noise energy to the components of the cepstrum.

Molau et al. ("Histogram based Normalization in the Acoustic Feature Space", ASRU 2001 Workshop on Automatic Speech Recognition and Understanding, 2001) and Hilger et al. ("Quantile Based Histogram Equalization for Noise Robust Recognition", EUROSPEECH 2001, pp. 1135–1138) disclose two off-line histogram normalization techniques, wherein the histogram of the training data and the histogram of the test data are required to be sent to the back-end in advance. These techniques are not practical in that more data of the distribution regarding the histogram is required. Furthermore, the method, according to Hilger et al., requires a delay (between speech input and speech recognition) of one utterance typically lasting several seconds. The method, according to Molau et al., is also impractical because it requires all the data from the same test speaker.

It is advantageous and desirable to provide a speech recognition front-end with improved performance, wherein the problems associated with the spreading of noise energy can be minimized, and the delay between speech input and speech recognition is reasonably short.

SUMMARY OF THE INVENTION

According to the first aspect of the present invention, there is provided a method of improving noise robustness in a speech recognition system, the system including a front-end for extracting speech features from an input speech and a back-end for speech recognition based on the extracted features, wherein the front-end comprises:

means, responsive to the input speech, for providing data indicative of the input speech at a plurality of time instants;

means, responsive to the data, for spectrally converting the data into a plurality of spectral coefficients having a related probability distribution of values for providing spectral data indicative of the spectral coefficients; and means, responsive to the spectral data, for performing decorrelation conversion on the spectral coefficients for providing the extracted features. The method is characterized by obtaining a parametric representation of the probability distribution of values of the spectral coefficients at different time instants;

modifying the parametric representation based on one or more reference values; and adjusting at least one of the spectral coefficients based on the modified parametric representation for changing the spectral data prior to the decorrelation conversion.

According to the present invention, a plurality of spectral coefficients of a training speech are used for matching, and the method is further characterized in that the one or more reference values include a mean value and a standard deviation of the spectral coefficients of the training speech, obtained based on a Gaussian approximation.

According to the present invention, the parametric representation comprises a mean value and a standard deviation of the various values of the spectral coefficients.

According to the second aspect of the present invention, there is provided a speech recognition front-end for use in a speech recognition system having a back-end, the front-end extracting speech features from an input speech so as to allow the back-end to recognize the input speech based on the extracted features, the front-end comprising:

means, responsive to the input speech, for providing data indicative of the input speech at a plurality of time instants;

means for spectrally converting the data into a plurality of spectral coefficients having a related probability distribution of values for providing spectral data indicative of the spectral coefficients; and means for performing decorrelation conversion on the spectral coefficients for providing the extracted features to the back-end. The front-end is characterized by means, responsive to the spectral coefficients, for obtaining a parametric representation of the probability distribution of values of the spectral coefficients at different time instants, for modifying the parametric representation based on one or more reference values, and for adjusting at least one of the spectral coefficients based on the modified parametric representation for changing the spectral data prior to the performing of the decorrelation conversion.

According to the third aspect of the present invention, there is provided a network element in a communication system including a back-end for receiving speech data from the network element, the network element comprising:

a voice input device to receive input speech; and a front-end, responsive to the input speech, for extracting speech features from the input speech for providing speech data indicative of the speech features so as to allow the back-end to recognize the input speech based on the speech features, wherein the front-end comprises:

means, responsive to the input speech, for providing data indicative of the input speech at a plurality of time instants;

means for spectrally converting the data into a plurality of spectral coefficients for providing spectral data indicative of the spectral coefficients having a related probability distribution of values; and means for performing decorrelation conversion on the spectral coefficients for providing the extracted features. The network element is characterized in that the front-end further comprises means, responsive to the spectral coefficients, for obtaining a parametric representation of the probability distribution of values of the spectral coefficients at different time instants, for modifying the parametric representation based on one or more reference values, and for adjusting at least one of the spectral coefficients based on the modified parametric representation for changing the spectral data prior to the performing of the decorrelation conversion.

According to the fourth aspect of the present invention, there is provided a computer program for use in a speech recognition front-end for extracting speech features from an input speech so as to allow a speech recognition back-end to recognize the input speech based on the extracted features, wherein the front-end comprises:

means, responsive to the input speech, for providing data indicative of the input speech at a plurality of time instants;

means for spectrally converting the data into a plurality of spectral coefficients having a related probability distribution of values for providing spectral data indicative of the spectral coefficients; and means for performing decorrelation conversion on the spectral coefficients for providing the extracted features. The computer program is characterized by an algorithm for generating a parametric representation of the probability distribution of values of the spectral coefficients at different time instants, for modifying the parametric representation based on one or more reference values, and for adjusting at least one of the spectral coefficients based on the modified parametric representation for changing the spectral data prior to the performing of the decorrelation conversion.

BEST MODE TO CARRY OUT THE INVENTION

Figure 1:
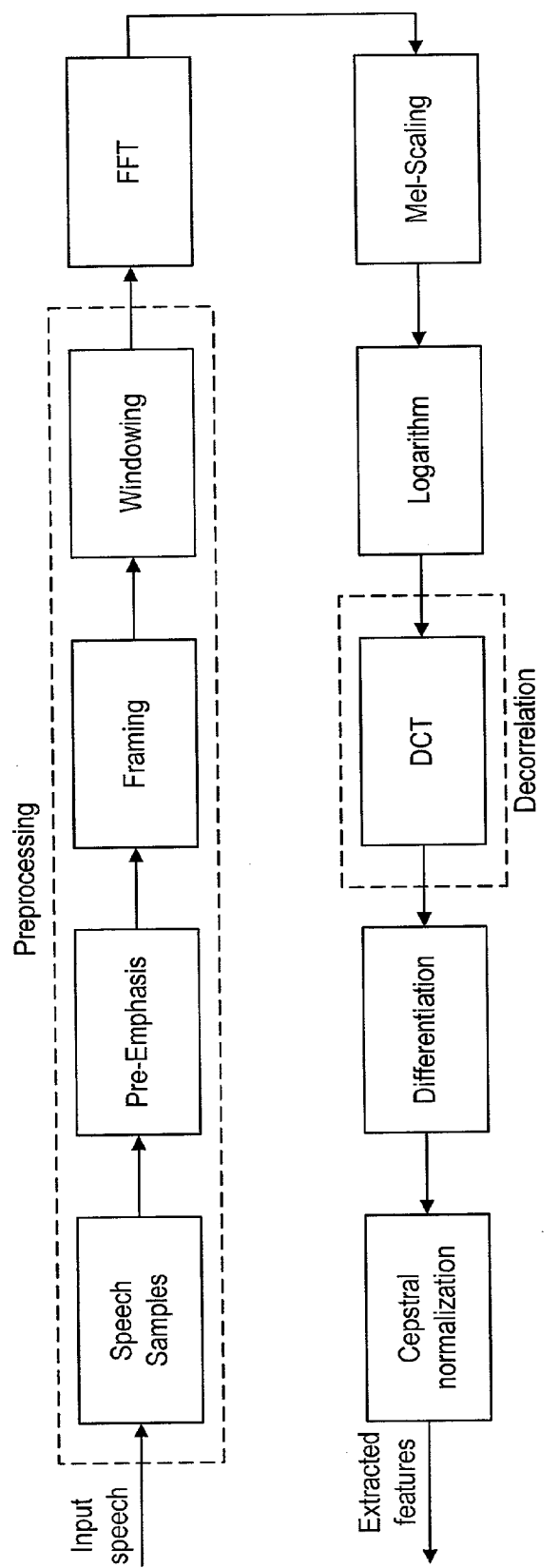
FIG. 1 is a block diagram showing a prior art MFCC front-end.
Figure 2:
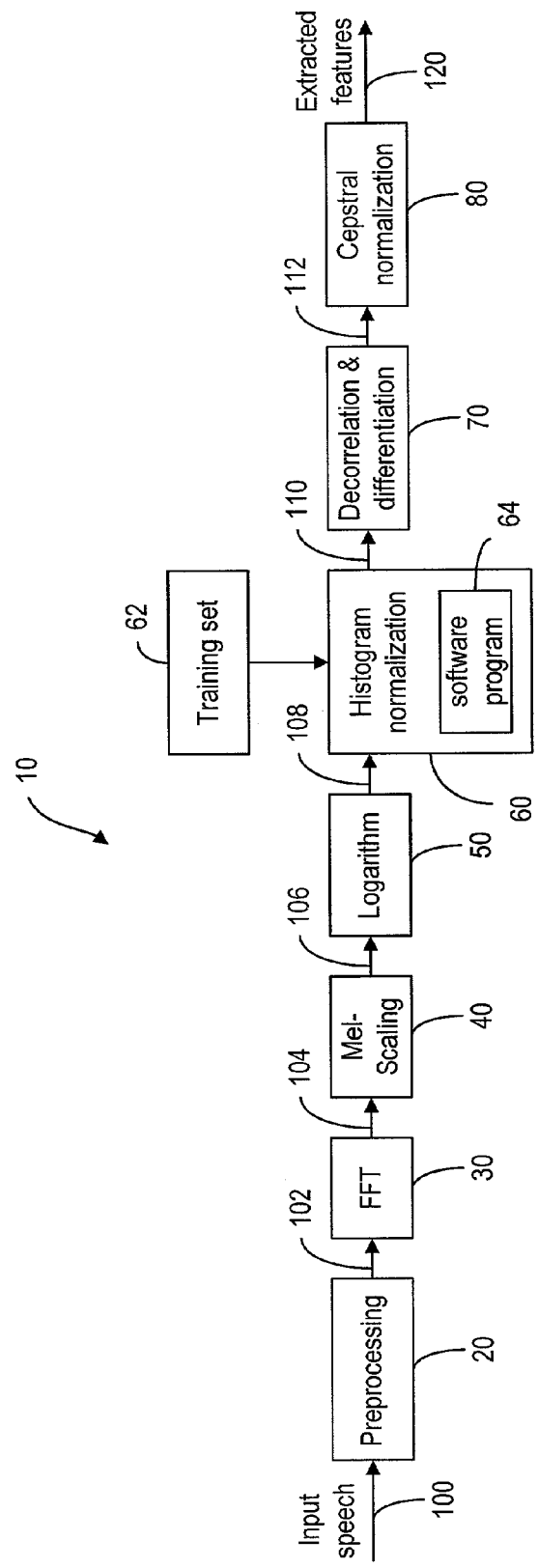
FIG. 2 is a block diagram showing the MFCC front-end, according to the present invention.

As discussed in the background section, when DCT is applied on the distorted spectral signals, the distortion spreads over all cepstral parameters. Consequently, feature vector normalization after DCT (in the cepstral domain) does not remove the spreading of noise in the cepstral coefficients. It is a primary objective of the present invention to provide a method of matching the features of an input speech to those of a training speech without being affected by the spreading of noise in the cepstral coefficients. This objective can be achieved by performing a histogram normalization step in the spectral domain, rather than the cepstral domain. This means that the normalization is carried out before the distortion (noise) spreads over all cepstral coefficients. In particular, histogram normalization is carried out before the DCT transform and, preferably, after the logarithmic compression (although it can also be carried out before the logarithmic compression), as shown in FIG. 2. FIG. 2 is a block diagram showing a DSR front-end 10, according to the present invention. As shown in FIG. 2, input speech 100 is processed by a preprocessing block 20 into speech samples 102 in frames. An FFT in block 30 is applied to the speech samples to compute the magnitude spectrum of the input speech signal. The output of the FFT block 30 is a plurality of spectral coefficients 104. After Mel scaling, the spectral coefficients are converted into an N dimensional vector 106, each component of the vector corresponds to the spectral energy of that frequency band. The output 106 of the Mel-filtering is subject to a natural logarithm function in block 50. The output 108 of the block 50 is known as the logarithmically-compressed Mel-filter bank output. When the values of the logarithmically compressed Mel-filter band output 108 are plotted against the likelihood of the values, a histogram of spectral signals is obtained. According to the present invention, the histogram of spectral signals is normalized to the histogram of a training set 62 using Gaussian approximations in block 60. The normalization procedure is carried out using a computer software program 64 according to a normalization algorithm as described in conjunction with Equations 1–4 below. The normalized spectral signals 110 are then converted into a set of cepstral coefficients 112 by the decorrelation module 70. The output of block 70 is further subjected to cepstral domain feature vector normalization in block 80. The reference numeral 120, as shown in FIG. 2, denotes the extracted features to be conveyed to a back-end, which is not shown. It should be noted that decorrelation, as carried out in block 70, can be understood as any process or transform, wherein the correlation between the samples of an input signal is reduced. For example, DCT, FFT, WT (wavelet transform) are all such transforms.

In contrast to the prior art cepstral domain normalization methods, where every cepstral coefficient is normalized to zero mean and unity variance, the present invention focuses attention on restoring the original clean training distributions in the spectral domain.

Normalization Algorithm

Preferably, the algorithm, according to the present invention, is based on Gaussian approximations of the training and testing histograms. However, it is also possible to use other approximations such as chi square, even distribution, and Poisson distribution. The Gaussian algorithm requires only a small amount of parameter vectors for estimation in order to obtain the estimates for the mean ($\mu$) and the standard deviation ($\sigma$) vectors. Because of the small number of parameters for estimation, the normalization can be carried out in an on-line fashion, as shown in FIG. 2. The present invention is effective partly because sufficient amount of data can be obtained in a relatively short time frame to reliably estimate the normalization parameters.

With regard to the training set, the mean $\mu_{train}$ and the standard deviation $\sigma_{train}$ are calculated using the log-spectrum vector components. These are the target values against which the normalization in the recognition phase is judged. As for the testing spectral signals, the mean $\mu_{test}$ and the standard deviation $\sigma_{test}$ are initialized to the values of $\mu_{train}$ and $\sigma_{train}$, respectively. The parameters of current speech data are estimated by using a 38-frames look-ahead buffer, and the values used in normalization are changed as follows:

$$\mu_{test} = \alpha_{Mean} * \mu_{test} + (1 - \alpha_{Mean}) * MEL \qquad (1)$$

$$(\sigma_{test})^2 = \alpha_{Var} * (\sigma_{test})^2 + (1 - \alpha_{Var}) * (MEL)^2 \qquad (2)$$

where MEL is the original log-Mel value, $\alpha_{Mean}$ and $\alpha_{Var}$ are coefficients having a value between 0 and 1. The normalized value of log-Mel is obtained as follows:

$$MEL' = (\sigma_{train}/\sigma_{test}) * (MEL - \mu_{test}) + \mu_{train} \qquad (3)$$

Eq. 3 represents a mapping between the normalized log-Mel value and the original log-Mel value. It should be noted that the number of frames used for obtaining the estimates can vary (for example, 19, 10 or even 5 or less). Similarly, the value of $\alpha_{Mean}$ and $\alpha_{Var}$ can be adjusted as needed (for example, between 0.05 and 0.20). Furthermore, the frames need not be successive. For example, only every second or third frame is selected for the estimation.

In order to make the mapping less aggressive, a weighting factor w may be used. When w=1, no mapping is taking place. When w=0, the testing distribution is mapped completely to the training distribution. In practice, a fixed w value between 0 and 1 is chosen. With the weighting factor, the modified log-Mel value is computed as follows:

$$MEL'' = wMEL + (1-w)MEL' \qquad (4)$$

When a weighting value between 0 and 1 is used, for example 0.7–0.9 or 0.1–0.3, the normalization process "moves" the noisy feature distributions only partially toward the training data distributions.

It is also possible to map the mean and standard deviation separately, i.e., the amount for adjusting the mean is different from the amount for adjusting the standard deviation. For this purpose, two weighting factors need to be defined: one for the mean and one for the standard deviation. Otherwise, the mapping takes place correspondingly to Eqs. 3 and 4, that is the standard deviation is changed by a first relative amount towards its reference value and the mean is changed by a second relative amount towards its reference value.

To illustrate the mapping between the normalized log-Mel value and the original log-Mel value, the trajectories and the histograms of the $7^{th}$ and the $21^{st}$ log-Mel bands for one speech utterance are shown in FIGS. 3–6. In each of the figures, both clean and noisy curves are shown. These figures show how the trajectories and histograms of the noisy data differ from the corresponding clean data. When comparing the histograms in FIGS. 4 and 6, it can be seen that this particular car noise corrupts the $7^{th}$ log-Mel band more than it corrupts the $21^{st}$ log-Mel band. This is mainly because the separation between the clean and noisy histograms of the $7^{th}$ log-Mel band is farther than the separation between the clean and noisy histograms of the $21^{st}$ log-Mel band. In general, histogram normalization should be carried out band by band, because the corruption on a particular band varies with the spectrum of the noise. However, it is possible to normalize only those bands that seem to be more susceptible to noise corruption. Accordingly, histogram normalization of a certain band is carried out only when the approximated histogram of the band differs greatly from the histogram of the training set. Otherwise, no normalization is necessary.

Figure 3:
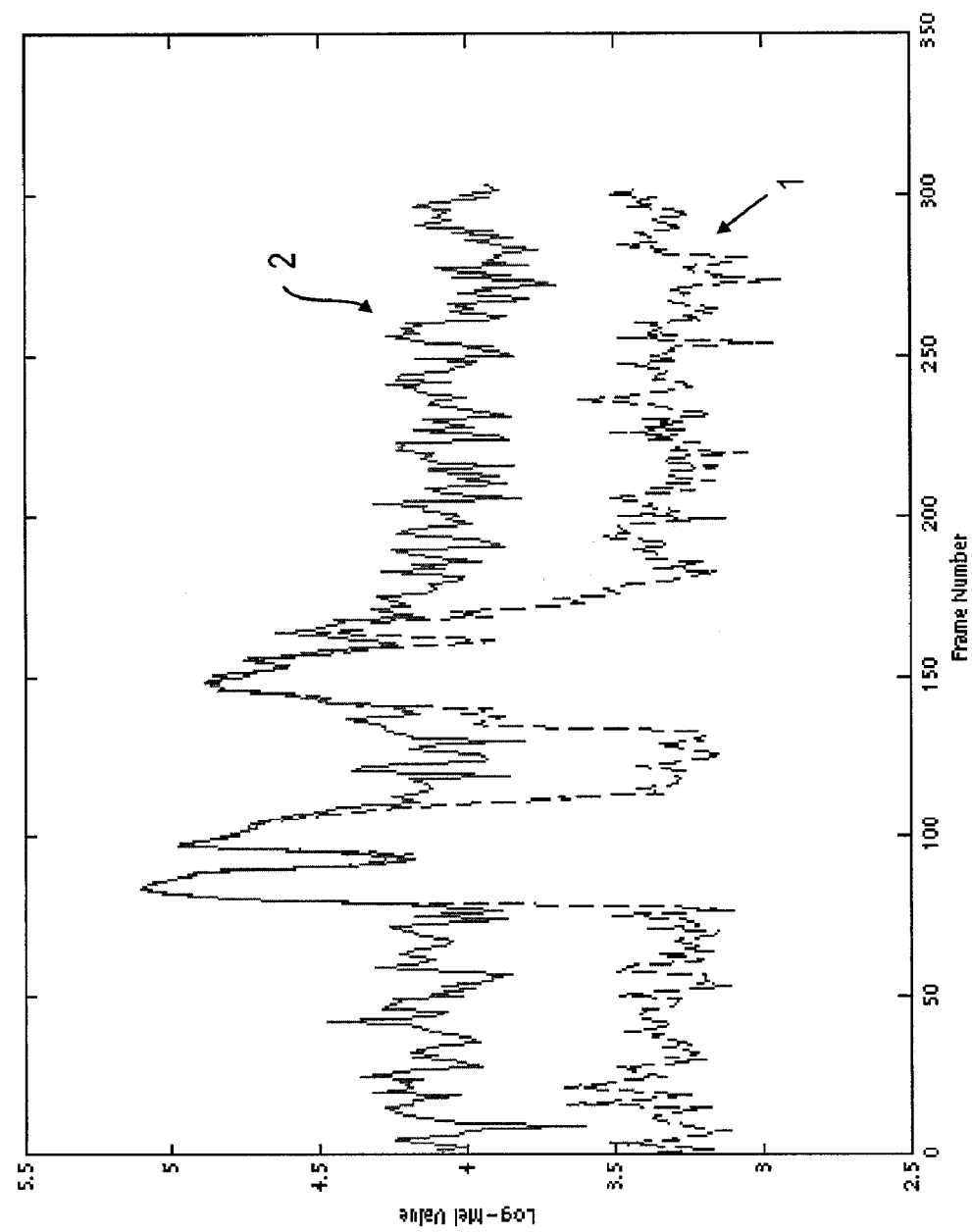
FIG. 3 shows the trajectory of the $7^{th}$ log-Mel band of one clean utterance and that of the same utterance with noise.
Figure 4:
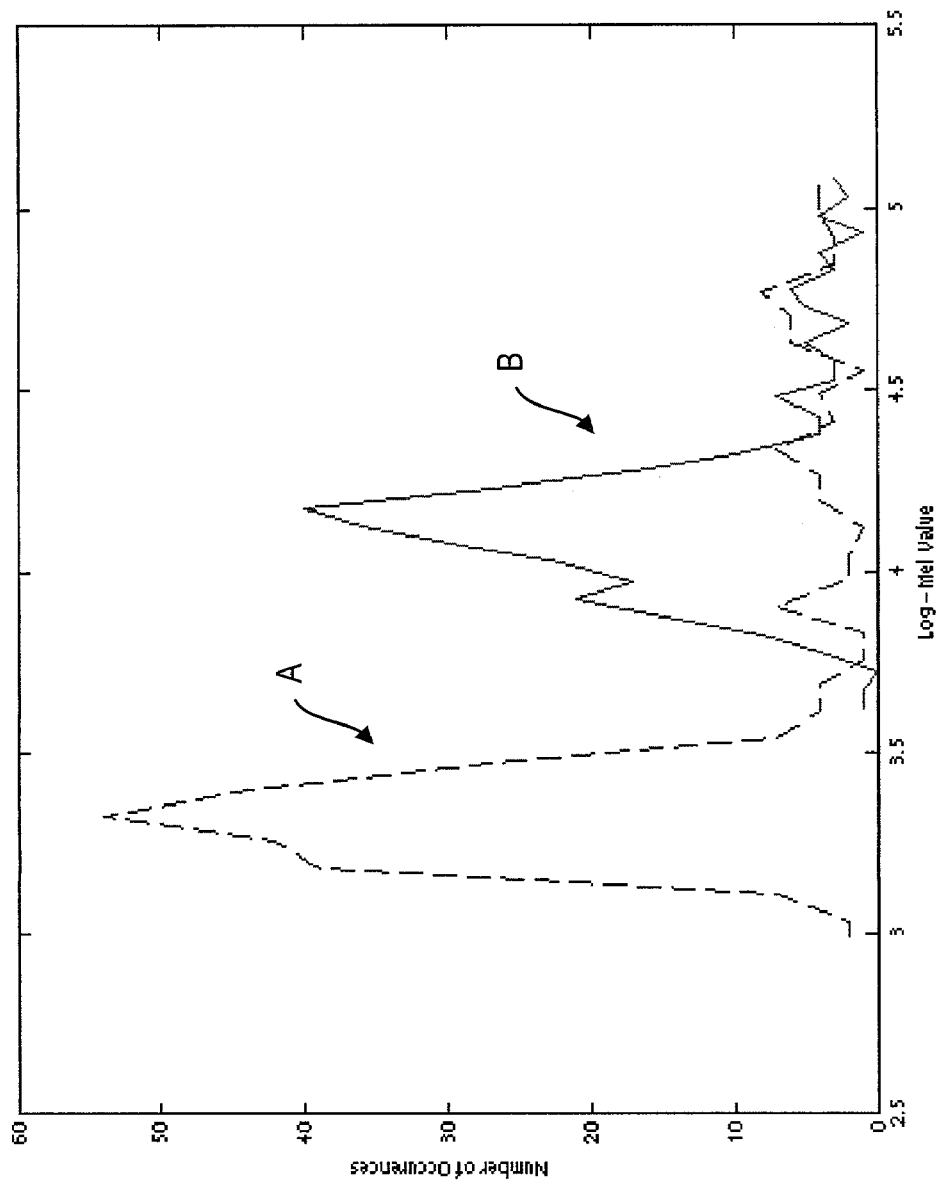
FIG. 4 shows the histograms of the trajectories of FIG. 3.
Figure 5:
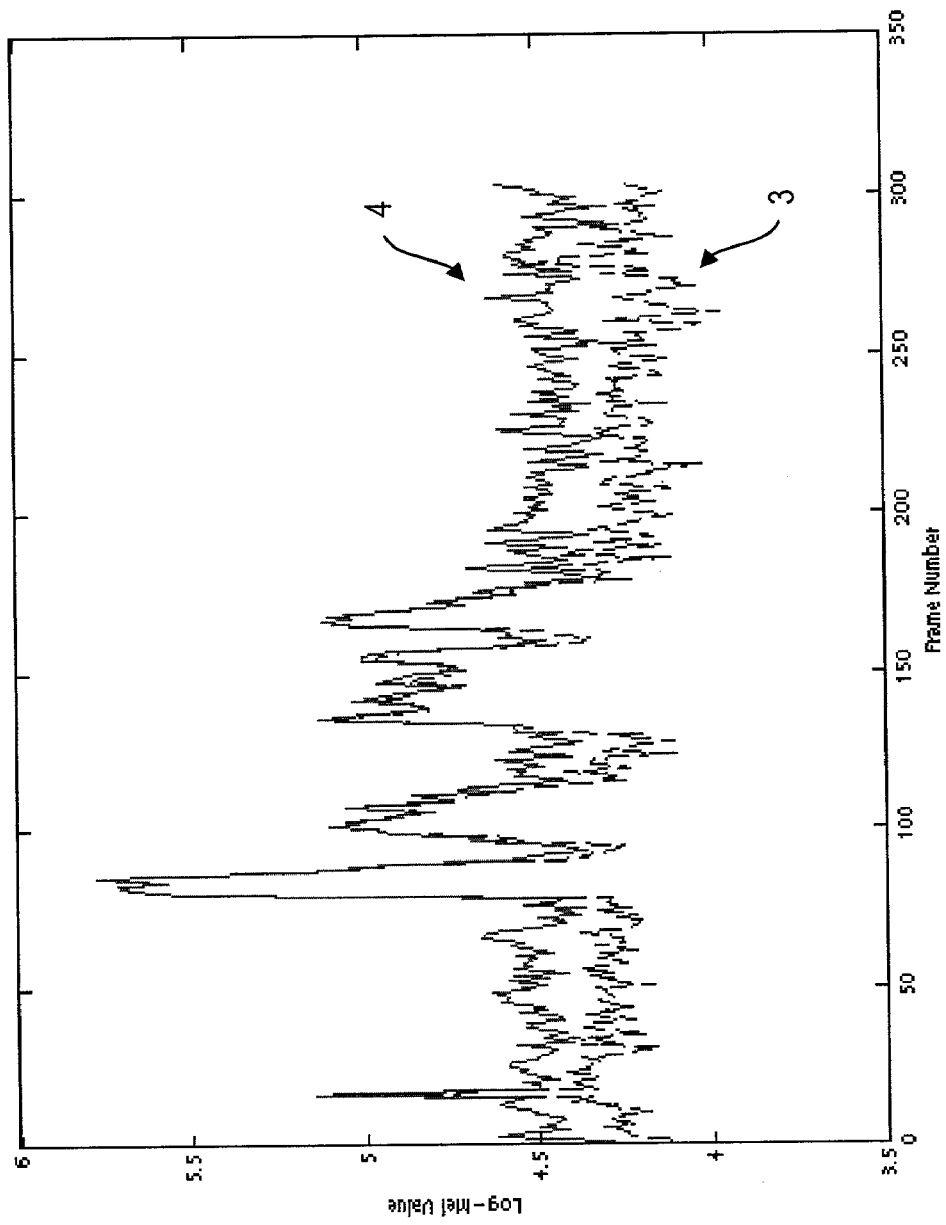
FIG. 5 shows the trajectory of the 21$^{st}$ log-Mel band of one clean utterance and that of the same utterance with noise.
Figure 6:
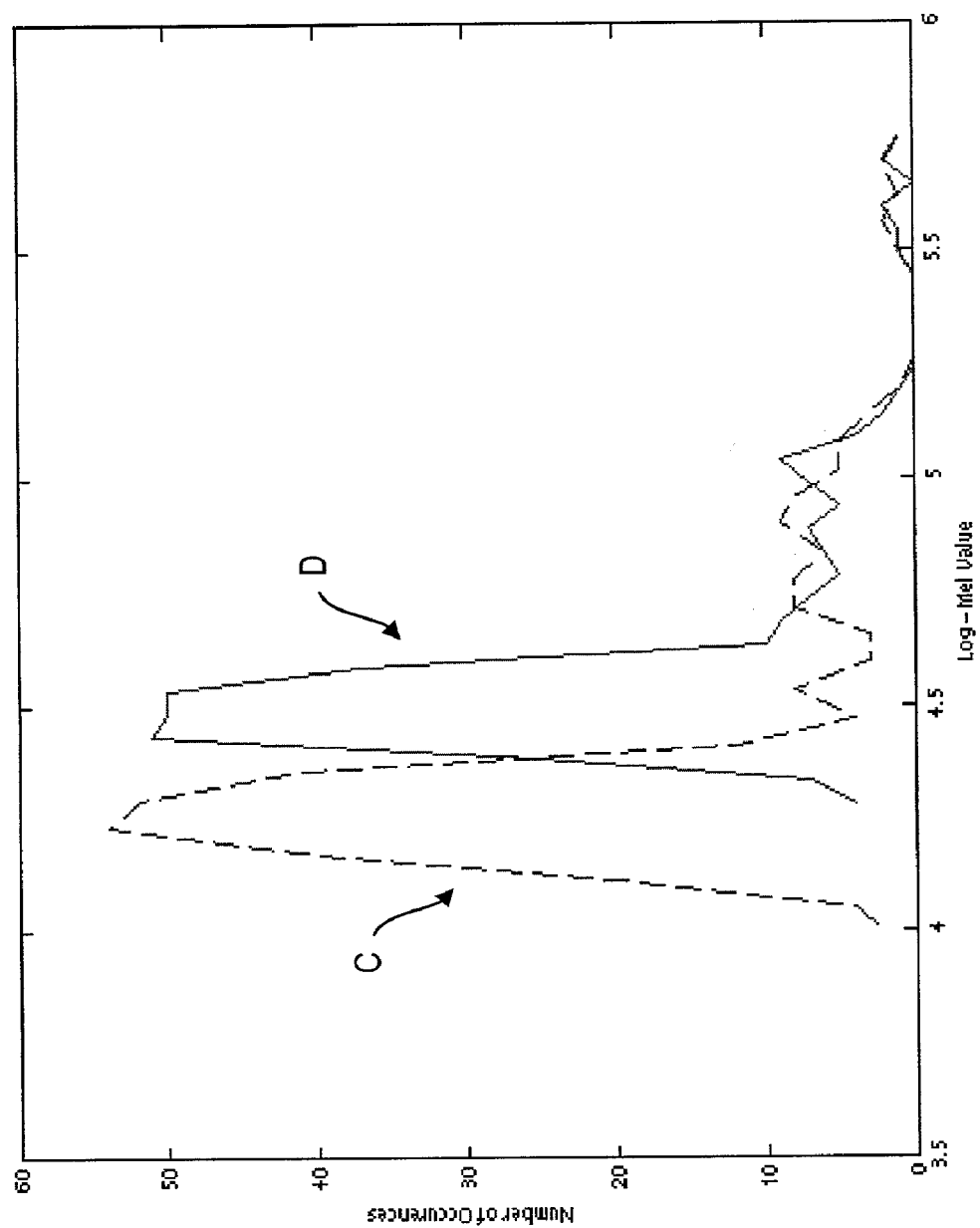
FIG. 6 shows the histograms of the trajectories of FIG. 5.

FIG. 3 shows the trajectories of the $7^{th}$ log-Mel band of one utterance: trajectory 1 is that of the clean utterance, and trajectory 2 is that of the same utterance after car noise is added to it. In FIG. 4, curve A and curve B are histograms of trajectory 1 and trajectory 2, respectively. FIG. 5 shows the trajectories of the $21^{st}$ log-Mel band of one utterance: trajectory 3 is that of the clean utterance, and trajectory 4 is that of the same utterance after car noise is added to it. In FIG. 6, curve C and curve D are histograms of trajectory 3 and trajectory 4, respectively. It should be noted that, in FIGS. 4 and 6, the histogram only represents a probability distribution of values, or the likelihood of occurrence of the log-Mel values, obtained as an estimate from the data of FIGS. 3 and 5, respectively.

Experimental Results

The testing was carried out in a multilingual, isolated word recognition task (name dialing) in four languages. The training data set contained the data from these languages, but none of the testing utterances or speakers was used in training. Table I shows the rates without speaker adaptation, and Table II contains the rates when Maximum A Posteriori (MAP) speaker adaptation was used. Note that Gaussian spectral normalization was utilized only in the testing phase. The data for training was processed with the standard MFCC front-end plus cepstral normalization.

TABLE I

|  | Baseline | GN | RERR | Baseline | GN | RERR |
|---|---|---|---|---|---|---|
|  | UK-ENGLISH | | | FRENCH | | |
| CLEAN | 91.94 | 92.38 | 5.5 | 91.27 | 91.26 | −0.1 |
| VOLVO | 80.91 | 84.70 | 19.9 | 86.20 | 88.03 | 13.3 |
| VW | 84.38 | 86.36 | 12.7 | 88.04 | 88.95 | 7.6 |
|  | GERMAN | | | SPANISH | | |
| CLEAN | 93.12 | 94.11 | 14.4 | 94.85 | 94.85 | 0.0 |
| VOLVO | 85.47 | 87.72 | 15.5 | 88.53 | 90.08 | 13.5 |
| VW | 88.07 | 89.46 | 11.7 | 90.97 | 91.78 | 9.0 |

TABLE II

|  | Baseline | GN | KERR | Baseline | GN | RERR |
|---|---|---|---|---|---|---|
|  | UK-ENGLISH | | | FRENCH | | |
| CLEAN | 95.83 | 96.11 | 6.7 | 94.94 | 95.25 | 6.1 |
| VOLVO | 92.24 | 92.44 | 2.6 | 92.50 | 93.17 | 8.9 |
| VW | 93.47 | 93.45 | −0.3 | 93.28 | 93.54 | 3.9 |
|  | GERMAN | | | SPANISH | | |
| CLEAN | 96.2 | 96.57 | 9.7 | 96.76 | 97.24 | 14.8 |
| VOLVO | 90.98 | 91.99 | 11.2 | 92.58 | 93.64 | 14.3 |
| VW | 92.35 | 93.50 | 15.0 | 93.55 | 94.04 | 7.6 |

The experimental results, as shown in TABLE I and TABLE II, are obtained from a multi-lingual isolated word recognition task using the aforementioned normalization algorithm. In particular, the values of coefficients in Equations 1, 2 and 4 are: $\alpha_{Mean}=\alpha_{Var}=0.985$, and $w=0.8$. These values are kept constant during the entire testing. It was found that the front-end system is not very sensitive to $\alpha_{Mean}$ and $\alpha_{Var}$. The invention was also tested with speech utterances contaminated with non-stationary noise, such as cafeteria noise, but the recognition accuracy was not improved. Thus, the conclusion is that the invention is able to improve recognition performance in quiet and in quasi-stationary noise environments such as car noise.

The major advantages of the present invention over the prior art methods include:

1. Significant improvements are achieved in the recognition accuracy in a noisy environment, without impairing the performance in a clean speech environment;

2. The normalization parameters are estimated on-line (in block 60) for every utterance, with the introduced algorithmic delay being reasonably short;

3. The requirements for static memory are negligible—only two parameter vectors representing the clean training statistics need to be stored (2×22 values);

4. The increase in run-time memory is small—38 spectral frames need to be buffered;

5. The on-line histogram normalization in the spectral domain is compatible with existing cepstral-domain feature vector normalization (block 80); and 6. Recognition rates are also improved when used together with MAP speaker adaptation.

Speech recognition features can be implemented in either a single-device speech recognition system or a distributed speech recognition system. In either case, the system comprises a front-end and a back-end. The back-end in a distributed system usually resides in a network while the front-end resides in a user device. In a single-device speech recognition system, both the front-end and the back-end are embedded in the same device. The method of improving noise robustness in speech recognition, according to the present invention, is particularly applicable to an embedded system. Thus, the noise robust front-end, according to the present invention, can be used in a desktop computer or a word processor, which allows a user to compose a document by dictating, for example. The front-end can be used in a hand-held electronic device, which allows a user to input text entry to the device using voice, for example. The front-end can be used in a smart home appliance, which recognizes words and phrases from any user so it can carry out a requested function, for example. The front-end can also be used in a smart house, smart clothing, smart furniture, and so forth. However, the front-end, according to the present invention, is also applicable to a distributed system. For example, the front-end can be used in a mobile terminal, which is a network element, as shown in FIG. 7.

Figure 7:
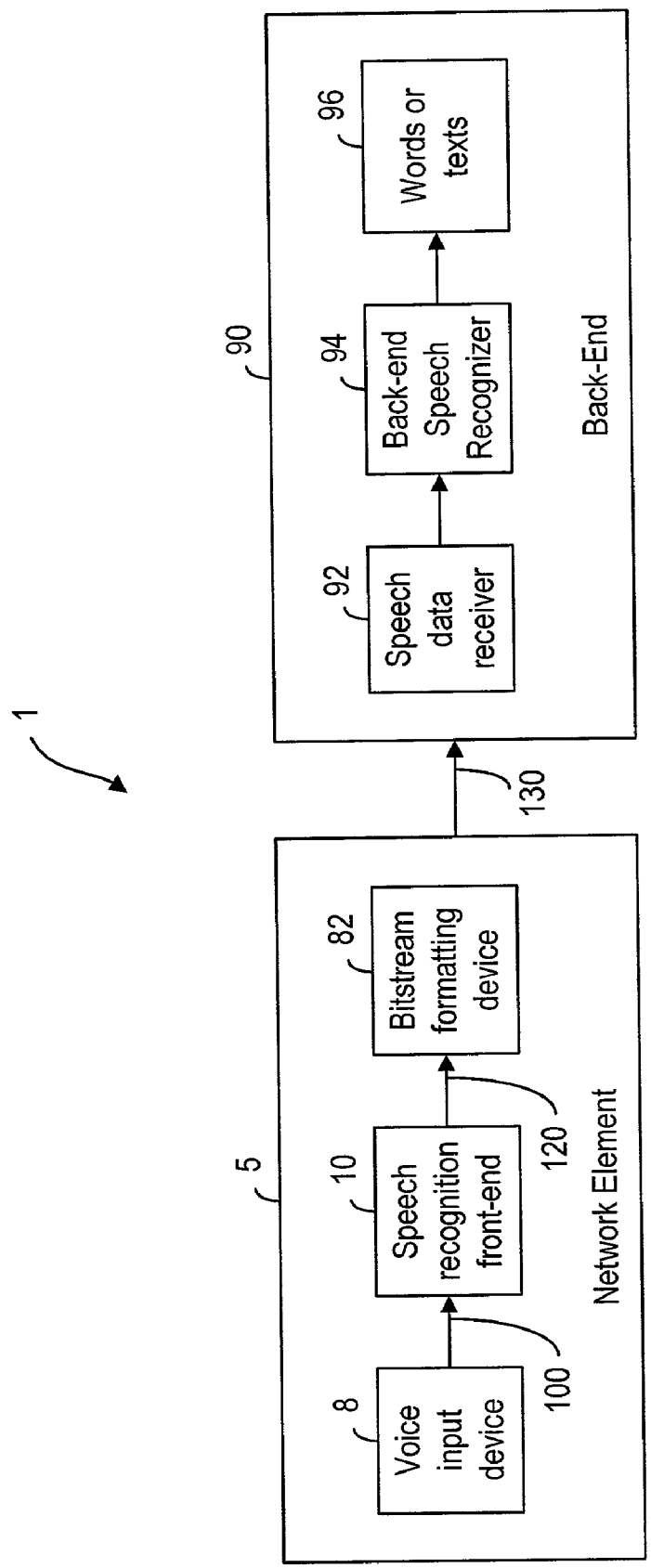
FIG. 7 is a block diagram showing a communication system including a network element having a speech recognition front-end, according to the present invention, and a speech recognition back-end.

FIG. 7 is a block diagram showing a communication system 1. The system 1 has a terminal or network element 5, which is used to convey speech data 130 indicative of the speech features 120 to a back-end device 90 for speech recognition. As shown in FIG. 7, the network element 5 comprises a voice input device 80 to receive input speech 100 from a user, for example. From the input speech 100, the front-end 10 extracts the speech features 120 according to the procedure as described in conjunction with FIG. 2. If necessary, a bitstream formatting module 82 is used to convert the extracted features 120 into speech data 130 for transmission. In the back-end 90, the speech data, as received by a speech data receiver 92, is processed by a back-end speech recognizer 94 for providing signals indicative of the input speech. A word or text generation device 96 is used to provide sound or display text of the recognized input speech.

Figure 8:
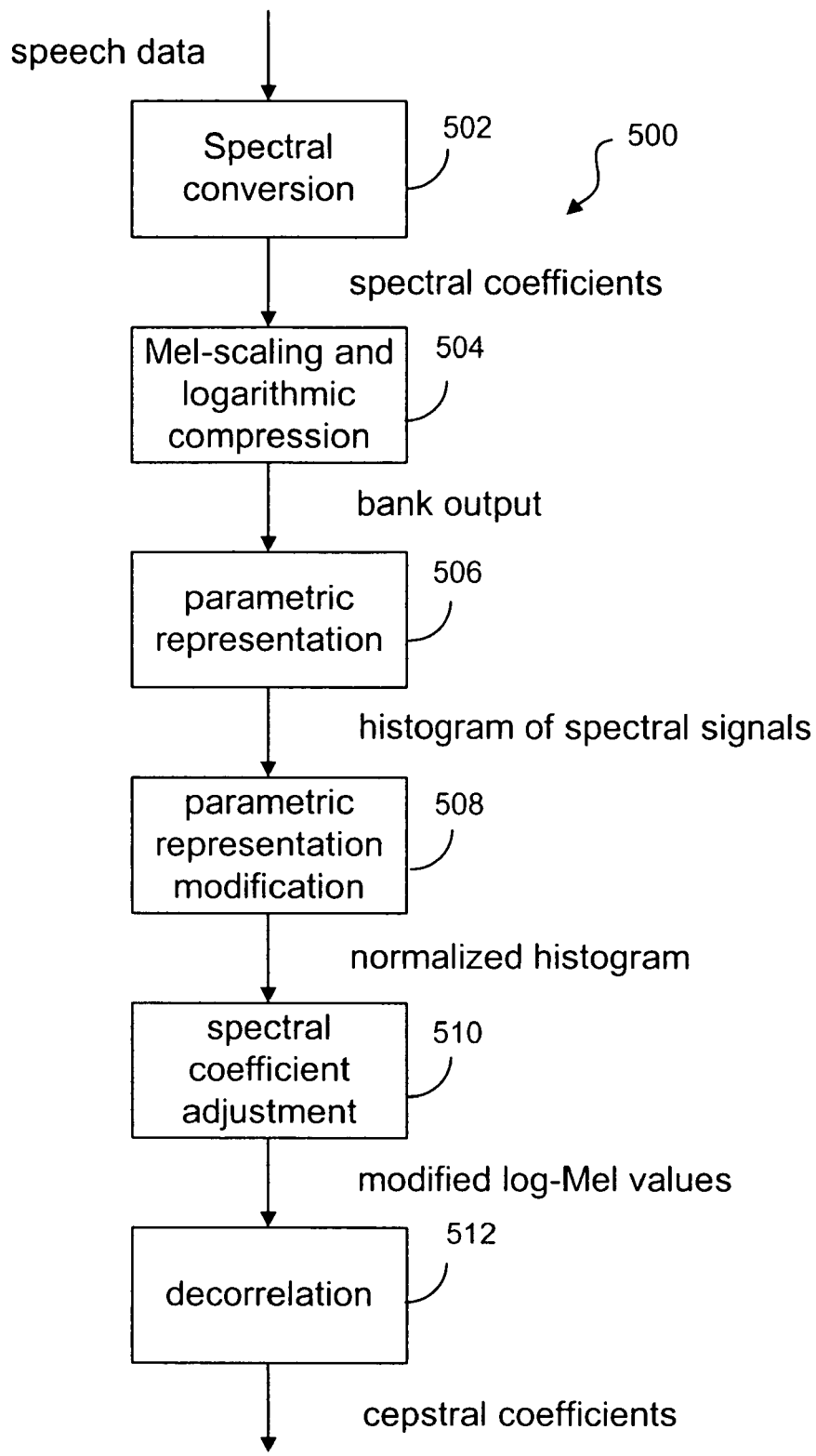
FIG. 8 is a flowchart illustrating the method of improving noise robustness, according to the present invention.

The method for improving noise robustness in speech recognition, according to the present invention, is illustrated in FIG. 8. As shown in the flowchart 500, speech data in the form of speech samples in frames is spectrally converted, at step 502, into a plurality of spectral coefficients by a FFT module, for example. At step 504, the spectral coefficients are converted into a logarithmically-compressed Mel-filter bank output by a Mel-scaling module and a natural logarithm function, for example. At step 506, the values of the logarithmically-compressed Mel-filter bank output are plotted against the likelihood of the values in order to obtain a parametric representation, or the histogram of spectral signals. This parametric representation is normalized, at step 508, using the mean value and the standard deviation of the testing spectral signals, for example, so as to obtain the normalized value of log-Mel. The normalized log-Mel values in the normalized parametric representation are further adjusted, at step 510, using a weighting factor, for example. The adjusted log-Mel values in the normalized parametric representation are then converted into a set of cepstral coefficients by a decorrelation module at step 512.

It should be noted that the histogram normalization step, according to the preferred embodiment of the present invention, is carried out before the DCT transform and, preferably, after the logarithmic compression. However, it is also possible to carry out the histogram normalization step before the logarithmic compression. Further, instead of adjusting the recognition parameters, the templates used for recognition can be adjusted by using the probability distribution of the input speech parameters to achieve virtually the same effect.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method, comprising:
providing in a speech recognition system speech data indicative of an input speech at a plurality of time instants based on the input speech, the speech data comprising a plurality of data segments;
spectrally converting the data segments into a plurality of spectral coefficients having a probability distribution of values in spectral domain for providing spectral data indicative of the spectral coefficients based on the data segments;
obtaining a parametric representation of the probability distribution of values of the spectral coefficients based on the spectral data;
modifying the parametric representation based on one or more reference values for providing a modified parametric representation;
adjusting at least one of the spectral coefficients in the spectral domain based on the modified parametric representation for changing the spectral data; and
performing decorrelation conversion on the changed spectral data for providing extracted features of the input speech.

2. The method of claim 1, wherein a plurality of spectral coefficients of a training speech are used for matching, and wherein
said one or more reference values include a mean value of the spectral coefficients of the training speech.

3. The method of claim 2, wherein
said one or more reference values further include a standard deviation of the spectral coefficients of the training speech.

4. The method of claim 1, wherein
the parametric representation comprises a mean value of the probability distribution of values of the spectral coefficients.

5. The method of claim 1, wherein
the parametric representation comprises a standard deviation of the probability distribution of values of the spectral coefficients.

6. The method of claim 1, wherein
the parametric representation is obtained based on a Gaussian approximation.

7. The method of claim 3, wherein the spectral coefficients of the training speech have a further probability distribution of values, and wherein
the mean value and the standard deviation are obtained based on a Gaussian approximation of the further probability distribution.

8. A speech recognition front-end comprising:
a processing module, responsive to the input speech, for providing data indicative of the input speech at a plurality of time instants;
a transform module for spectrally converting the data into a plurality of spectral coefficients having a related probability distribution of values in a spectral domain for providing spectral data indicative of the spectral coefficients;
a software program, responsive to the spectral coefficients, for obtaining a parametric representation of the probability distribution of values of the spectral coefficients, for modifying the parametric representation based on one or more reference values, and for adjusting at least one of the spectral coefficients in the spectral domain based on the modified parametric representation for changing the spectral data; and
a decorrelation module, responsive to the modified parametric representation, for providing extracted features based on the changed spectral data.

9. The front-end of claim 8, wherein a plurality of spectral coefficients of a training speech are used for matching, and wherein said one or more reference values include a mean value of the spectral coefficients of the training speech.

10. The front-end of claim 9, wherein
said one or more reference values further include a standard deviation of the spectral coefficients of the training speech.

11. The front-end of claim 8, wherein
the parametric representation comprises a mean value of the probability distribution of values of the spectral coefficients.

12. The front-end of claim 8, wherein
the parametric representation comprises a standard deviation of the probability distribution of values of the spectral coefficients.

13. The front-end of claim 8, wherein
the parametric representation is obtained based on a Gaussian approximation.

14. The front-end of claim 10, wherein the spectral coefficients of the training speech have a further probability distribution of values, and wherein the mean value and the standard deviation are obtained based on a Gaussian approximation of the further probability distribution.

15. A network element in a communication system comprising:
a voice input device to receive input speech; and
a speech recognition front-end, responsive to the input speech, for extracting speech features from the input speech for providing speech data indicative of the speech features so as to allow the back-end to recognize the input speech based on the speech features, wherein the front-end comprises:
a processing module, responsive to the input speech, for providing data indicative of the input speech at a plurality of time instants;
a transform module for spectrally converting the data into a plurality of spectral coefficients for providing spectral data indicative of the spectral coefficients having a related probability distribution of values in spectral domain;
a computation module for performing decorrelation conversion on the spectral coefficients for providing the extracted features, and
a software program, responsive to the spectral coefficients, for obtaining a parametric representation of the probability distribution of values of the spectral coefficients, for modifying the parametric representation based on one or more reference values, and for adjusting at least one of the spectral coefficients in the spectral domain based on the modified parametric representation for changing the spectral data prior to the performing of the decorrelation conversion.

16. The network element of claim 15, wherein a plurality of spectral coefficients of a training speech are used for matching, and wherein
said one or more reference values include a mean value of the spectral coefficients of the training speech.

17. The network element of claim 16, wherein
said one or more reference values further include a standard deviation of the spectral coefficients of the training speech.

18. The network element of claim 15, wherein
the parametric representation comprises a mean value of the probability distribution of values of the spectral coefficients.

19. The network element of claim 15, wherein
the parametric representation comprises a standard deviation of the probability distribution of values of the spectral coefficients.

20. The network element of claim 15, wherein
the parametric representation is obtained based on a Gaussian approximation.

21. The network element of claim 17, wherein the spectral coefficients of the training speech have a further probability distribution of value, wherein the mean value and the standard deviation are obtained based on a Gaussian approximation of the further probability distribution.

22. A software application product comprising a storage medium having a software application for use in a speech recognition front-end, the front end configured for extracting speech features from an input speech so as to allow a speech recognition back-end to recognize the input speech based on the extracted features, wherein the front-end
is configured to provide data indicative of the input speech at a plurality of time instants;
to spectrally convert the data into a plurality of spectral coefficients having a related probability distribution of values in spectral domain for providing spectral data indicative of the spectral coefficients; and
to perform decorrelation conversion on the spectral coefficients for providing the extracted feature, said software application comprising
an algorithm for generating a parametric representation of the probability distribution of values of the spectral coefficients, for modifying the parametric representation based on one or more reference values, and for adjusting at least one of the spectral coefficients in the spectral domain based on the modified parametric representation for changing the spectral data prior to the performing of the decorrelation conversion.

23. The software application product of claim 22, wherein
a plurality of spectral coefficients of a training speech are used for matching, and wherein
said one or more reference values include a mean value of the spectral coefficients of the training speech.

24. The software application product of claim 23, wherein
said one or more reference values include a standard deviation of the spectral coefficients of the training speech.

25. The software application product of claim 22, wherein
the parametric representation comprises a mean value of the probability distribution of values of the spectral coefficients.

26. The software application product of claim 22, wherein
the parametric representation comprises a standard deviation of the probability distribution of values of the spectral coefficients.

27. The software application product of claim 22, wherein
the parametric representation is obtained based on a Gaussian approximation.

28. The software application product of claim 24, wherein
the coefficients of the training speech has a further probability distribution of values, and wherein
the mean value and the standard deviation are obtained from a Gaussian approximation of the further probability distribution.

29. An electronic module, comprising:
means, responsive to an input speech in a speech recognition front-end, for providing data indicative of the input speech at a plurality of time instants, the speech data comprising a plurality of data segments;
means for spectrally converting the data segments into a plurality of spectral coefficients having a probability distribution of values in a spectral domain for providing spectral data indicative of the spectral coefficients;
means for performing decorrelation conversion on the spectral coefficients for providing extracted features based on the data segments;
means for obtaining a parametric representation of the probability distribution of values of the spectral coefficients, means for modifying the parametric representation based on one or more reference values, and means, for adjusting at least one of the spectral coefficients in the spectral domain based on the modified parametric representation for changing the spectral data prior to the decorrelation conversion on the spectral coefficients.

30. The electronic module of claim 29, further comprising:

means, responsive to the modified parametric representation, for providing extracted features based on the changed spectral data.

31. The electronic module of claim 29, wherein a plurality of spectral coefficients of a training speech are used for matching, and wherein said one or more reference values include a mean value of the spectral coefficients of the training speech.

32. The electronic module of claim 31, wherein said one or more reference values further include a standard deviation of the spectral coefficients of the training speech.

* * * * *